(12) United States Patent
Ooyama

(10) Patent No.: US 7,312,895 B2
(45) Date of Patent: Dec. 25, 2007

(54) IMAGE PROCESSING APPARATUS AND METHOD

(75) Inventor: Takeshi Ooyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/437,304

(22) Filed: May 14, 2003

(65) Prior Publication Data

US 2003/0218764 A1 Nov. 27, 2003

(30) Foreign Application Priority Data

May 23, 2002 (JP) .............................. 2002-149140

(51) Int. Cl.
*H04N 1/60* (2006.01)
*G03F 3/08* (2006.01)
*G06K 9/00* (2006.01)

(52) U.S. Cl. ..................... 358/1.9; 358/518; 382/167

(58) Field of Classification Search ................ 358/1.9, 358/518, 520, 523, 515, 536, 538, 540, 166; 382/167, 162, 164, 165

See application file for complete search history.

(56) References Cited

U.S. PATENT DOCUMENTS

| | | | | |
|---|---|---|---|---|
| 5,521,722 A | * | 5/1996 | Colvill et al. ............... | 358/500 |
| 5,825,986 A | * | 10/1998 | Ferguson .................... | 358/1.9 |
| 5,949,438 A | * | 9/1999 | Cyman et al. ............... | 345/502 |
| 6,008,812 A | | 12/1999 | Ueda et al. ................. | 345/418 |
| 6,023,344 A | | 2/2000 | Yabe .......................... | 358/296 |
| 6,091,850 A | * | 7/2000 | Ostrovsky ................... | 382/166 |
| 6,118,896 A | * | 9/2000 | Ohnuma ...................... | 382/167 |
| 6,181,838 B1 | * | 1/2001 | Knowlton .................... | 382/305 |
| 6,212,354 B1 | * | 4/2001 | Garzolini et al. ........... | 399/324 |
| 6,246,791 B1 | * | 6/2001 | Kurzweil et al. ........... | 382/162 |
| 6,344,908 B1 | * | 2/2002 | Aritomi ....................... | 358/529 |
| 6,591,010 B1 | * | 7/2003 | Russin ........................ | 382/209 |
| 6,654,145 B1 | * | 11/2003 | Speck ......................... | 358/1.9 |
| 6,798,542 B1 | * | 9/2004 | Kimura et al. ............. | 358/3.02 |
| 6,825,941 B1 | * | 11/2004 | Nguyen et al. ............. | 358/1.15 |
| 7,057,764 B1 | * | 6/2006 | Sakaue ........................ | 358/1.9 |
| 7,072,507 B2 | * | 7/2006 | Ohga .......................... | 382/164 |
| 7,127,125 B2 | * | 10/2006 | Perlmutter et al. ......... | 382/294 |
| 7,164,493 B1 | * | 1/2007 | Matsumoto et al. ......... | 358/1.9 |
| 7,187,798 B1 | * | 3/2007 | Payton ........................ | 382/166 |
| 2001/0017705 A1 | * | 8/2001 | Hashizume et al. ......... | 358/1.9 |
| 2002/0085752 A1 | * | 7/2002 | Ohga .......................... | 382/165 |
| 2003/0016221 A1 | * | 1/2003 | Long et al. .................. | 345/441 |
| 2003/0021437 A1 | * | 1/2003 | Hersch et al. .............. | 382/100 |
| 2003/0038952 A1 | * | 2/2003 | Matsukubo et al. ......... | 358/1.2 |

(Continued)

FOREIGN PATENT DOCUMENTS

JP 1-168167 7/1989

(Continued)

*Primary Examiner*—Madeleine A V Nguyen
(74) *Attorney, Agent, or Firm*—Fitzpatrick, Cella, Harper & Scinto

(57) ABSTRACT

This invention has as its object to prevent image quality deterioration of vector and raster image parts by allowing adjustment of the toner amount for respective objects when single image data includes both vector and raster image parts. To accomplish this, image data is separated into vector and raster image parts, a vector or raster image attribute is assigned to each pixel, and the toner amount is adjusted for each pixel of each object.

14 Claims, 4 Drawing Sheets

U.S. PATENT DOCUMENTS

| | | | |
|---|---|---|---|
| 2003/0090689 A1* | 5/2003 | Klassen | 358/1.9 |
| 2003/0133612 A1* | 7/2003 | Fan | 382/199 |
| 2004/0095589 A1* | 5/2004 | Arai | 358/1.2 |
| 2004/0151377 A1* | 8/2004 | Boose et al. | 382/193 |
| 2005/0111759 A1* | 5/2005 | Perlmutter et al. | 382/294 |
| 2005/0146533 A1* | 7/2005 | Sanborn et al. | 345/611 |
| 2006/0120626 A1* | 6/2006 | Perlmutter et al. | 382/294 |
| 2006/0152750 A1* | 7/2006 | Ohta et al. | 358/1.13 |

FOREIGN PATENT DOCUMENTS

| | | |
|---|---|---|
| JP | 9-37094 | 2/1997 |
| JP | 9-270924 | 10/1997 |
| JP | 11-261833 | 9/1999 |

* cited by examiner

FIG. 4

TONER AMOUNT LIMITATION

VECTOR IMAGE PART
● LIMIT TONER AMOUNT
○ NOT LIMIT TONER AMOUNT

RASTER IMAGE PART
○ LIMIT TONER AMOUNT
● NOT LIMIT TONER AMOUNT

IMAGE PROCESSING APPARATUS AND METHOD

FIELD OF THE INVENTION

The present invention relates to an image processing apparatus and method and, more particularly, to an image processing apparatus and method, which adjust the level of an input image signal for each object in an input image, and faithfully reproduce the number of colors or output using the number of colors corresponding to the performance of an output destination apparatus depending on objects.

BACKGROUND OF THE INVENTION

Conventionally, an image processing apparatus and method, which adjust the level of an input image signal in correspondence with the performance of an output destination apparatus, are known.

Also, an image processing apparatus and method, which allow the user to select, on a console, whether or not to apply the adjustment, are known.

However, these prior arts suffer the following problems.

If image data contains a vector image part, the conventional image processing apparatus and method, which adjust the level of an input image signal in correspondence with the performance of an output destination apparatus, can effectively prevent the vector image part from scattering. However, if image data contains both a vector image part and a raster image part, the raster image part also undergoes the adjustment, and the entire raster image part will have faded color tone. Hence, the image quality and color appearance that the user wants cannot be obtained.

In the image processing apparatus and method, which allow the user to select, on a console, whether or not to apply the adjustment, the above selection cannot be individually made for a vector image part and raster image part. If image data contains both a vector image part and raster image part, and the user selects to apply the adjustment, the vector image part can be prevented from scattering, but the color appearance of the raster image part fades. On the other hand, if the user selects not to apply the adjustment, the color appearance of the raster image part can be faithfully reproduced, but scattering of the vector image part stands out.

SUMMARY OF THE INVENTION

In order to solve the above problem, the present invention provides an image processing apparatus and method, which can adjust the level of an input image signal for each object in an input image.

According to an aspect of the present invention, the foregoing object is attained by providing an image processing apparatus which processes input image data, and sends processed image data to an output device, wherein a level of the input image data is adjusted for each object on the basis of an object attribute of the input image data, a sum total of levels of respective color components of the input image data, and performance of the output device.

According to another aspect of the present invention, the foregoing object is attained by providing an image processing method which processes input image data, and sends processed image data to an output device, wherein a level of the input image data is adjusted for each object on the basis of an object attribute of the input image data, a sum total of levels of respective color components of the input image data, and performance of the output device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows an example of a console according to the third embodiment.

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
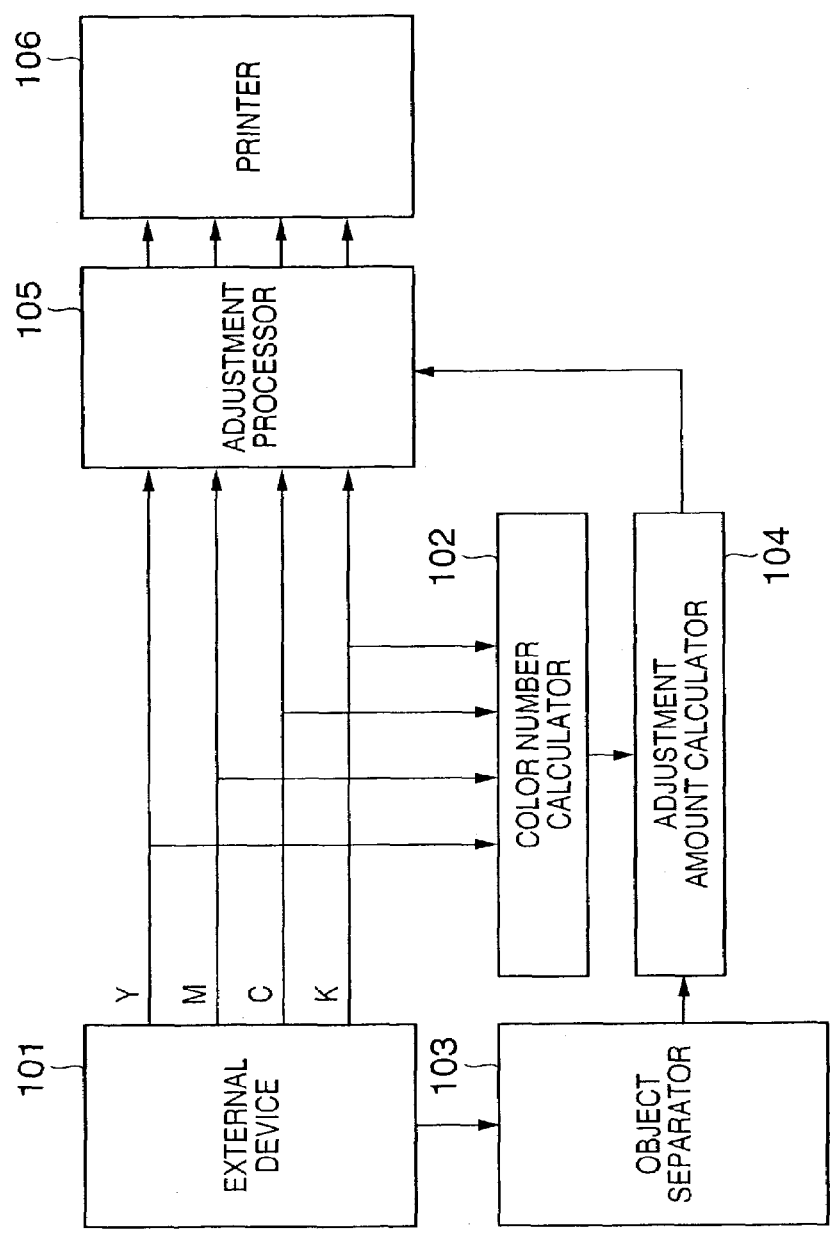
FIG. 1 is a block diagram showing an example of the arrangement of the first embodiment according to the present invention.

FIG. 1 is a block diagram showing an example of the arrangement of the first embodiment.

A color number calculator 102 calculates the levels of C, M, Y, and K signals sent from an external device 101 for respective pixels. Let Sam_In be the sum total of signal values sent from the external device 101. Then, if each color is an 8-bit signal, a sum total Color_In of the numbers of colors calculated by the color number calculator 102 is defined by:

$$Color\_In = Sam\_in/255 \quad (1)$$

An object separator 103 separates image data sent from the external device 101 into a vector image part and raster image part, assigns a vector or raster image attribute to each pixel, and sends attribute information of each pixel to an adjustment amount calculator 104.

The adjustment amount calculator 104 calculates the adjustment amounts of C, M, Y, and K signal values sent from the external device 101, which can make these values fall within the performance range of a printer 106. If a value obtained by dividing the maximum value (the maximum value of the sum total of the levels of respective color component signals) of the input levels of a printer by 255 (each color=8 bits) is used as an index that represents printer performance, and is defined as the maximum number Color_Lim of colors (e.g., 2.7 colors), a limit amount (adjustment amount) Lim to be calculated by the adjustment amount calculator 104 is given by:

$$Lim = Color\_Lim/Color\_In \quad (2)$$

Of course, if the level of an input image signal does not exceed the maximum number Color_Lim of colors of the printer performance (Color_In≦Color_Lim), since the input level need not be limited, Lim=1.0 is set not to limit the input level.

Whether or not the calculation of the adjustment amount calculator 104 is applied is determined depending on attribute information (vector or raster image attribute) which is assigned to each pixel by the object separator 103. If an object has a vector image attribute, C, M, Y, and K signal values are adjusted by the above calculation formula; if an object has a raster image attribute, the above calculation formula is not applied, and Lim=1.0.

If an object has a vector image attribute, an adjustment processor 105 converts input image signals into those within the performance range of the printer 106 on the basis of the limit amount Lim by:

$$C' = C \times Lim$$

$$M' = M \times Lim$$

$$Y' = Y \times Lim$$

$$K' = K \times Lim \quad (3)$$

With this process, the color balance of input image signals can be maintained. For example, if all input image signals are 255 and respective pixels of an input image have a text attribute, the sum total Color_In of the number of input colors is 4.0 (colors), and exceeds the maximum number of colors=2.7 of the printer 106. Hence, the color number adjustment amount Lim is 2.74/4.0=0.675. Then, the adjustment processor 105 limits each input image signal to 255×0.675=172.

As described above, according to this embodiment, the number of colors of an input image signal can be switched for each object of input image data. When an object corresponds to a vector image part, its number of colors is limited to 2.7 colors or less, which can fall within the performance range of the printer 106, thus obtaining a high-quality output image without causing scattering or the like. On the other hand, when an object corresponds to a raster image part, its number of colors remains unchanged upon output. Hence, the color appearance of the image can be prevented from fading, and an output image that the user wants can be obtained.

Second Embodiment

An image processing apparatus according to the second embodiment of the present invention will be described below. Note that the same reference numerals in the second embodiment denote substantially the same parts as those in the first embodiment, and a detailed description thereof will be omitted.

Figure 2:
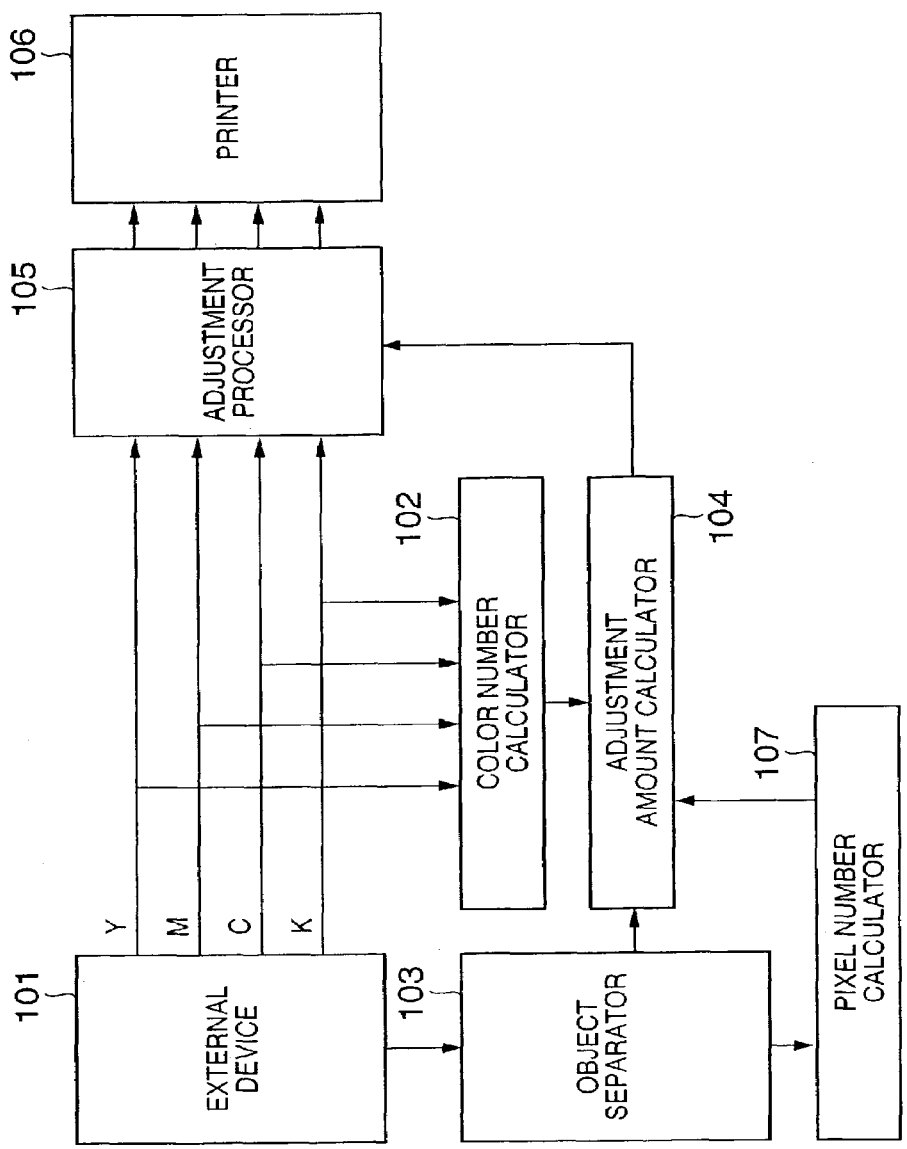
FIG. 2 is a block diagram showing an example of the arrangement of the second embodiment according to the present invention.

FIG. 2 is a block diagram showing an example of the arrangement of the second embodiment.

A pixel number calculator 107 calculates the number of pixels to which a vector image attribute is assigned by the object separator 103, and the number of pixels to which a raster image attribute is assigned by the object separator 103.

When the number of pixels with the vector image attribute is equal to or larger than the number of pixels with the raster image attribute, the attributes of all the pixels are converted into a vector image attribute, and such attribute information is sent to the adjustment amount calculator 104. If the number of pixels with the raster image attribute is larger than the number of pixels with the vector image attribute, the attributes of all the pixels are converted into a raster image attribute, and such attribute information is sent to the adjustment amount calculator 104.

As described above, according to this embodiment, when one image data contains many vector image parts, the number of colors of the entire image data is limited to 2.7 colors or less, which can fall within the performance range of the printer 106, thus obtaining a high-quality output image without causing scattering or the like. On the other hand, when one image data contains many raster image parts, the number of colors of the entire image data remains unchanged upon output. Hence, the color appearance of the image can be prevented from fading, and an output image that the user wants can be obtained.

Third Embodiment

An image processing apparatus according to the third embodiment of the present invention will be described below. Note that the same reference numerals in the third embodiment denote substantially the same parts as those in the first embodiment, and a detailed description thereof will be omitted.

Figure 3:
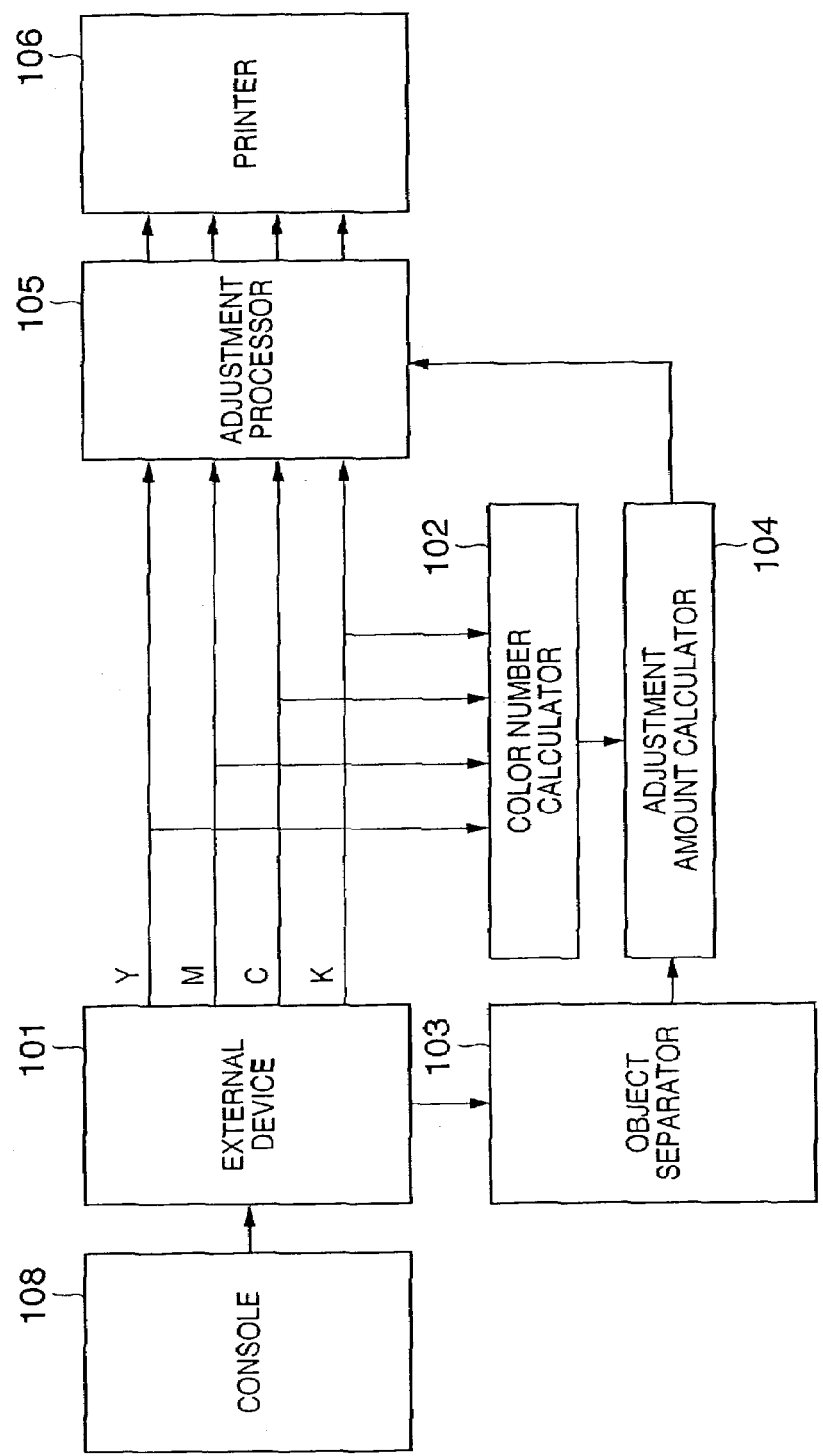
FIG. 3 is a block diagram showing an example of the arrangement of the third embodiment according to the present invention.

FIG. 3 is a block diagram showing an example of the arrangement of the third embodiment.

A console 108 is a device used to set whether or not to make adjustment by the adjustment processor 105. The console 108 displays a setup dialog which allows the user to select whether or not the toner amount is limited for each of objects of vector and raster image parts.

FIG. 4 shows the screen of the console which displays the setup dialog. The user selects one of "limit toner amount" and "not limit toner amount" for each of objects of vector and raster image parts using radio buttons.

In an object designated with "limit toner amount", the calculation of the first embodiment is applied to pixels with that attribute, and the number of colors of that object is limited to fall within the performance range of the printer 106. On the other hand, in an object designated with "not limit toner amount", the above calculation is not applied to pixels with that attribute, and the object having even the number of colors falling outside the performance range of the printer 106 is output.

As described above, according to this embodiment, a user who does not want any transfer error, fixing error, scattering, and the like can avoid them by selecting "limit toner amount". On the other hand, a user who does not mind such transfer error, fixing error, scattering, and the like can select "not limit toner amount". That is, the toner amount of an output image can be adjusted in correspondence with user's favor.

Other Embodiment

The preferred embodiments of the present invention have been explained, and the present invention may be applied to either a system constituted by a plurality of devices, or an apparatus consisting of a single equipment.

Note that the present invention includes a case wherein the invention is achieved by directly or remotely supplying a software program that implements the functions of the aforementioned embodiments to a system or apparatus, and reading out and executing the supplied program code by a computer of that system or apparatus. In this case, the form is not limited to a program as long as it has functions of the program.

Therefore, the program code itself installed in a computer to implement the functional process of the present invention using the computer implements the present invention. That is, the appended claims of the present invention include the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy® disk, hard disk, optical disk, magnetooptical disk, MO, CD-ROM, CD-R, CD-RW, magnetic tape, nonvolatile memory card, ROM, DVD (DVD-ROM, DVD-R) and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the appended claims of the present invention include a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

According to the aforementioned embodiments, an image processing apparatus and method, which can adjust the level of an input image signal for each object in an input image, can be provided.

The present application claims priority from Japanese Patent Application No. 2002-149140, which is incorporated herein by reference.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which processes input image data, and sends processed image data to an output device, comprising:

determination means for determining whether each pixel of the input image data is contained in a vector image or a raster image;

calculation means for calculating a sum total of levels of respective color components for respective pixels of the input data;

comparison means for comparing the sum total of the levels of the respective color components calculated by said calculation means with an allowable input level of the output device; and adjustment means for, when said determination means determines that a pixel of interest of the input data is contained in the vector image, adjusting the level of the pixel of interest based on the result of the comparison, while when said determination means determines that a pixel of interest of the input data is contained in the raster image, maintaining the level of the pixel of interest.

2. The apparatus according to claim 1, wherein when the sum total of the levels of the respective color components calculated by said calculation means is larger than the allowable input level of the output device as a result of comparison by said comparison means, said adjustment means reduces the level of the input image data to be lower than the allowable input level of the output device.

3. The apparatus according to claim 1, wherein said determination means determines an object attribute corresponding to a larger number of pixels contained in the input image data as the object attribute of the input image data.

4. The apparatus according to claim 1, further comprising setting means for setting whether or not to make adjustment by said adjustment means.

5. The apparatus according to claim 4, wherein said setting means sets whether or not to make adjustment by said adjustment means for each object attribute.

6. The apparatus according to claim 4, wherein said setting means includes means for displaying a setup dialog which is used to set whether or not to make adjustment by said adjustment means for each object attribute.

7. The apparatus according to claim 1, wherein the image input data is CMY or CMYK image data, and the output device is an image forming device.

8. An image processing method which processes input image data, and sends processed image data to an output device, comprising:

determination means for determining whether each pixel of the input image data is contained in a vector image or a raster image;

calculation means for calculating a sum total of levels of respective color components for respective pixels of the input data;

comparison means for comparing the sum total of the levels of the respective color components calculated by said calculation means with an allowable input level of the output device; and adjustment means for, when said determination means determines that a pixel of interest of the input data is contained in the vector image, adjusting the level of the pixel of interest based on the result of the comparison, while when said determination means determines that a pixel of interest of the input data is contained in the raster image, maintaining the level of the pixel of interest.

9. The method according to claim 8, wherein the adjustment step includes a step of reducing, when the sum total of the levels of the respective color components calculated in the calculation step is larger than the allowable input level of the output device as a result of comparison in the comparison step, the level of the input image data to be lower than the allowable input level of the output device.

10. The method according to claim 8, wherein the determination step includes a step of determining an object attribute corresponding to a larger number of pixels contained in the input image data as the object attribute of the input image data.

11. The method according to claim 8, further comprising a setting step of setting whether or not to make adjustment in the adjustment step.

12. The method according to claim 11, wherein the setting step includes a step of setting whether or not to make adjustment in he adjustment step for each object attribute.

13. The method according to claim 11, wherein the setting step includes a step of displaying a setup dialog which is used to set whether or not to make adjustment in the adjustment step for each object attribute.

14. The method according to claim 8, wherein the image input data is CMY or CMYK image data, and the output device is an image forming device.

* * * * *